US009025190B2

(12) United States Patent
Sato et al.

(10) Patent No.: US 9,025,190 B2
(45) Date of Patent: May 5, 2015

(54) BOX PRINT REALIZED BY IMAGE FORMING APPARATUS HAVING NO AUXILIARY STORAGE DEVICE

(71) Applicant: Kyocera Document Solutions Inc., Osaka (JP)

(72) Inventors: Masafumi Sato, Osaka (JP); Hiroshi Manabe, Osaka (JP); Toshimitsu Morimoto, Osaka (JP); Koji Kubono, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/138,778

(22) Filed: Dec. 23, 2013

(65) Prior Publication Data

US 2014/0185091 A1 Jul. 3, 2014

(30) Foreign Application Priority Data

Dec. 28, 2012 (JP) .................. 2012-286963

(51) Int. Cl.
G06K 15/02 (2006.01)
G06F 3/12 (2006.01)
H04N 1/00 (2006.01)

(52) U.S. Cl.
CPC .......... *G06K 15/1806* (2013.01); *G06F 3/1203* (2013.01); *G06F 3/122* (2013.01); *G06F 3/1267* (2013.01); *G06F 3/1268* (2013.01); *G06F 3/1285* (2013.01); *H04N 1/00* (2013.01)

(58) Field of Classification Search
USPC ...................................... 358/1.15
See application file for complete search history.

(56) References Cited

U.S. PATENT DOCUMENTS

| 7,979,892 B2* | 7/2011 | Mizumukai .................. 726/2 |
| 2001/0038462 A1 | 11/2001 | Teeuwen et al. |
| 2005/0068564 A1 | 3/2005 | Ferlitsch |
| 2011/0128572 A1* | 6/2011 | Hosotsubo ................ 358/1.15 |
| 2012/0057199 A1* | 3/2012 | Ikeura .................... 358/1.15 |

FOREIGN PATENT DOCUMENTS

JP 2005-111957 A 4/2005

OTHER PUBLICATIONS

Extended European Search Report and Opinion for App. No. EP 13199580.5, mailed Jun. 4, 2014.

* cited by examiner

*Primary Examiner* — Ngon Nguyen
(74) *Attorney, Agent, or Firm* — McDonnell Boehnen Hulbert & Berghoff LLP

(57) ABSTRACT

An image forming system includes an image forming apparatus and an information processing apparatus coupled to the network. The image forming apparatus stores, in a memory device, an information processing apparatus identifier that is assigned to the button and transmits, to the information processing apparatus, press-down information that includes the information processing apparatus identifier corresponding to the button that is pressed-down, in response to a request for the press-down information that is received from the information processing apparatus via the network The image forming apparatus also prints, on a sheet, an image based on print job data that is received from the information processing apparatus via the network, if, in the information processing apparatus, it is determined that the information processing apparatus identifier in the press-down information matches with the information processing apparatus identifier of the information processing apparatus.

18 Claims, 9 Drawing Sheets

BOX PRINT REALIZED BY IMAGE FORMING APPARATUS HAVING NO AUXILIARY STORAGE DEVICE

RELATED APPLICATIONS

This application is based upon, and claims priority to Japanese Patent Application No. 2012-286963, filed in the Japan Patent Office on Dec. 28, 2012, the entire contents of which are incorporated herein by reference.

FIELD

Unless otherwise indicated herein, the description in this field section or the background section is not prior art to the claims in this application and is not admitted to be prior art by inclusion in this section. The present disclosure generally relates to an image forming system, an image forming apparatus, and an image forming method, for realizing a box print by the image forming apparatus having no auxiliary storage device.

BACKGROUND

A typical image forming apparatus includes a hard disk (HDD) serving as an auxiliary storage device, and has a box print function. A box, as defined in this disclosure, is a virtual storage area within the auxiliary storage device that may store any number of document files and a print job. The box print function executes a print job stored within the box, and printing is carried out by an instruction via a printer driver, a fax driver, an operation panel of the personal computer, or the like.

However, it may be difficult for an inexpensive image forming apparatus to realize the box print function, since inexpensive image forming apparatuses commonly have no HDD and typically have a small memory capacity.

SUMMARY

The present disclosure relates to an image forming system, an image forming apparatus, and an image forming method that realizes a box print by the image forming apparatus having no auxiliary storage device.

An image forming system according to an embodiment of the present disclosure includes an image forming apparatus coupled to a network and an information processing apparatus coupled to the network.

The image forming apparatus includes a button, a memory device, a printing unit including a printer or a facsimile machine, and a first control unit.

The first control unit is configured to store, in the memory device, an information processing apparatus identifier that is assigned to the button. The first control unit is also configured to transmit, to the information processing apparatus, press-down information including the information processing apparatus identifier corresponding to the button that is pressed-down, in response to a request for the press-down information that is received from the information processing apparatus via the network. The first control unit is further configured to cause the printing unit to print, on a sheet, an image based on print job data that is received from the information processing apparatus via the network.

The information processing apparatus includes an auxiliary storage device, an input unit, a printing unit driver including a printer driver or a facsimile driver, a spooler, and a second control unit.

The second control unit is configured to periodically transmit the request for the press-down information to the image forming apparatus via the network, in response to a print-start instruction via at least one of the input unit or the printing unit driver. The second control unit is also configured to determine whether or not the information processing apparatus identifier in the press-down information that is received from the image forming apparatus matches with the information processing apparatus identifier of the information processing apparatus. The second control unit is further configured to transmit the print job data specified by at least one of the input unit or the printing unit driver to the image forming apparatus via the spooler if the information processing apparatus identifier in the press-down information that is received from the image forming apparatus matches the information processing apparatus identifier of the information processing apparatus.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

[First Embodiment]

Figure 1:
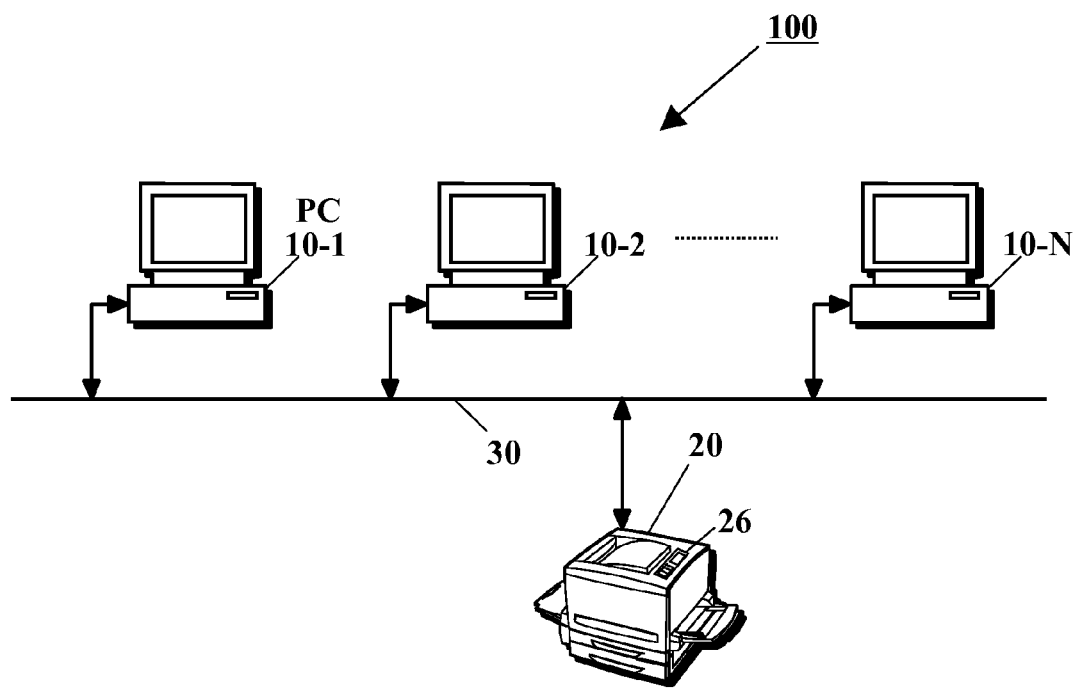
FIG. 1 is a schematic diagram illustrating a configuration of an image forming system according to a first embodiment of the present disclosure.

FIG. 1 is a schematic diagram illustrating the configuration of an image forming system according to a first embodiment of the present disclosure.

In the image forming system 100, personal computers (PCs) 10-1 to 10-N serving as information processing apparatuses, whose number is N, and an image forming apparatus 20 are coupled owing to a network 30. In particular, the image forming apparatus 20 is inexpensive, and has no auxiliary storage device.

Figure 2:
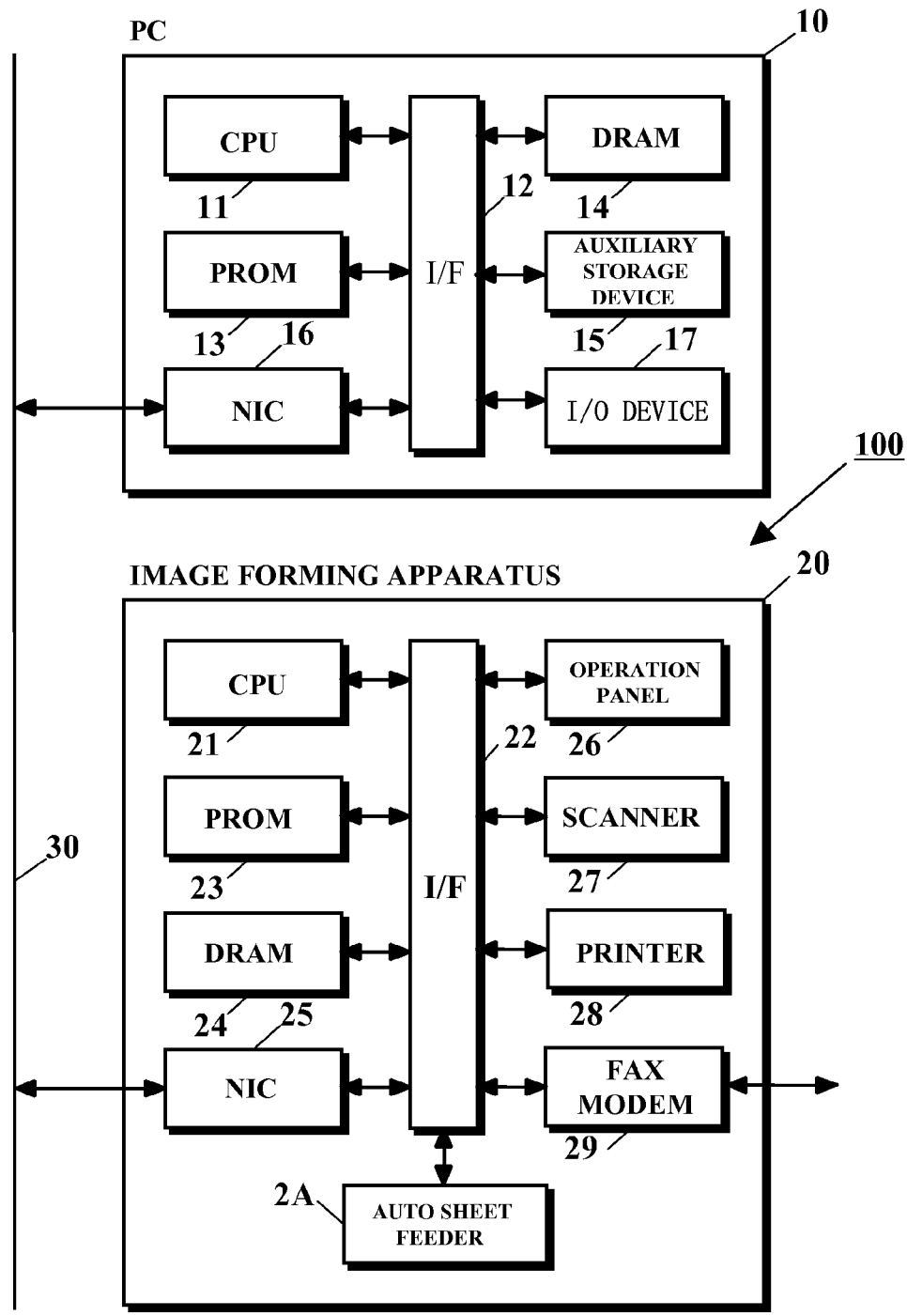
FIG. 2 is a block diagram illustrating hardware configurations of an information processing apparatus (e.g. a PC) and an image forming apparatus in the image forming system.

FIG. 2 is a block diagram illustrating the hardware configurations of the PC 10 and the image forming apparatus 20 in the image forming system 100.

The PC 10 is a personal computer, and a central processing unit (CPU) 11 is coupled to a programmable read only memory (PROM) 13, a dynamic random access memory (DRAM) 14, an auxiliary storage device 15, a network interface card (NIC) 16, and an input-output (I/O) device 17 via an interface 12. In FIG. 2, interface 12 may be any type of interface that may be used to allow communication among the CPU 11, the PROM 13, the DRAM 14, the NIC 16, and the I/O device 17.

The PROM 13 is, for example, a flash memory device, and a basic input/output system (BIOS) may be stored therein. The DRAM 14 is used as a main storage device. An operating system (OS) and various kinds of drivers and application are stored in the auxiliary storage device 15.

In the image forming apparatus 20, via an interface 22, a CPU 21 is coupled to a PROM 23, a DRAM 24, a network interface 25, an operation panel 26, a scanner 27, a printer 28, a facsimile (FAX) modem 29, and an auto sheet feeder 2A. In FIG. 2, interface 22 may be any type of interface that may be used to allow communication among the CPU 11, the PROM 13, the DRAM 14, the NIC 16, and the I/O device 17.

The PROM 23 is, for example, a flash memory device, and may store therein a BIOS, an OS, various kinds of drivers, and applications that run on the image forming apparatus. The DRAM 24 is used as a main storage device. The network interface 25 is coupled to the network 30. The scanner 27 is used for digitizing an image on a paper medium, and the file thereof may be used for printing, facsimile transmission, or file transmission. The printer 28 includes a print engine, a paper feeding unit, a transport unit, and a paper ejection unit, which perform various tasks to paper. In addition to this, bitmap data stored on the DRAM 24 is supplied to the printer 28, and the printer 28 forms an electrostatic latent image on a photoconductive drum on the basis of this data, develops this image using toner, transfers and fixes a toner image to a sheet of paper, and ejects the sheet of paper.

Figure 3:
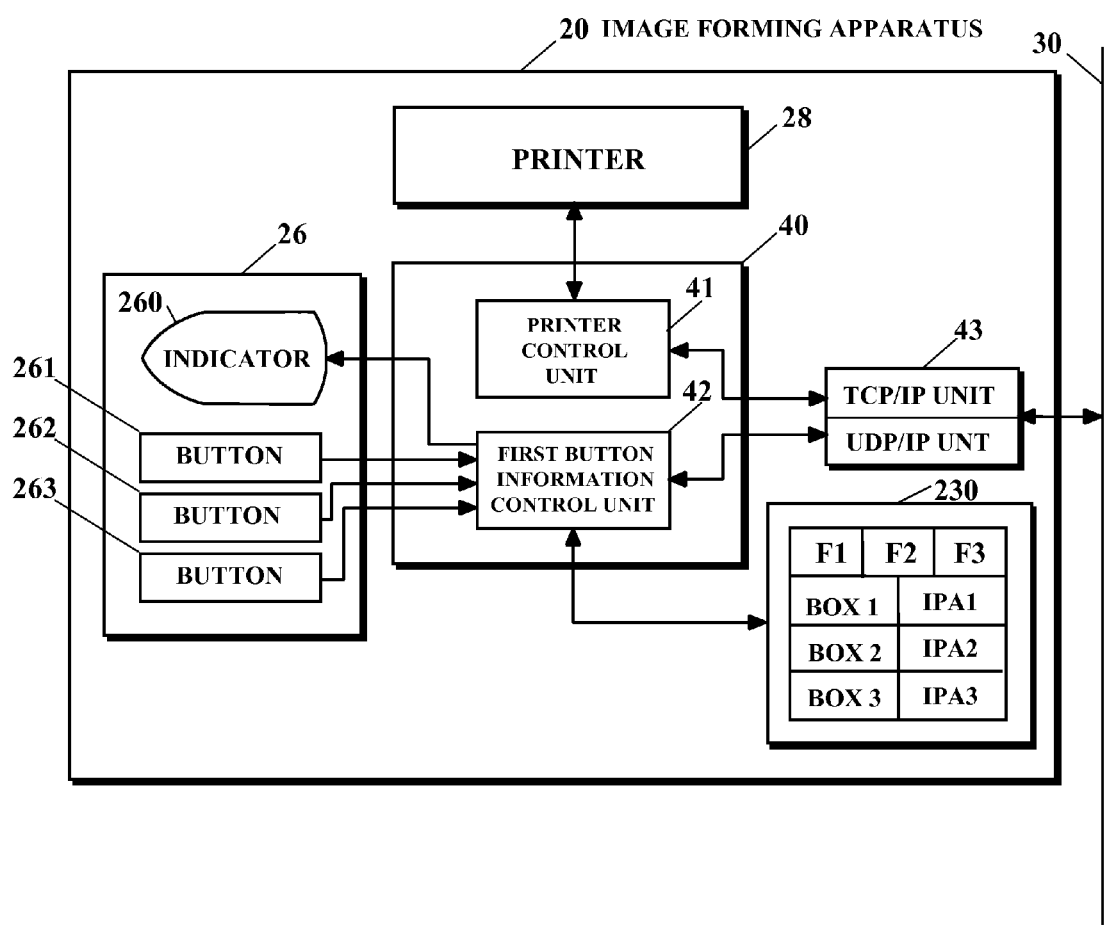
FIG. 3 is a block diagram illustrating a functional configuration relating to a printer in the image forming apparatus.

FIG. 3 is a block diagram illustrating the functional configuration relating to the printer 28 in the image forming apparatus 20.

A first control unit 40 includes a printer control unit 41 for the printer 28, and a first button information control unit 42 for the operation panel 26 and a button information storage unit 230 within the PROM 23.

The operation panel 26 includes buttons 261 to 263 used for starting the execution of a print function, and an indicator 260 displaying the button name of a button pressed down from among the buttons 261 to 263.

The button information storage unit 230 stores therein, as button information: flags F1 to F3 indicating whether or not the buttons 261 to 263 have been pressed down, respectively; IP addresses IPA1 to IPA3 serving as PC identifiers assigned to the buttons 261 to 263, respectively; and box names (BOX 1 to BOX 3) assigned to the buttons 261 to 263, respectively.

When a button 26i (i: one of 1 to 3) has been pressed down, the first button information control unit 42 refers to the button information storage unit 230, and causes the indicator 260 to display the box name, "BOX i", thereof and sets a flag Fi within the button information storage unit 230. In addition, in response to print termination from the printer control unit 41, the first button information control unit 42 resets the flag Fi that is displayed in the indicator 260 and corresponds to the "BOX i", and clears the indicator 260.

A first communication unit 43 includes the network interface 25 in FIG. 2 and a communication protocol stack for the OS. The communication protocol stack includes a TCP/IP unit and a UDP/IP unit. The first communication unit 43 individually sorts pieces of information received from a TCP/IP unit and a UDP/IP unit in the PC 10, into the printer control unit 41 and the first button information control unit 42.

The TCP/IP unit in the first communication unit 43 receives job data from a spooler in the PC 10. In addition, the UDP/IP unit in the first communication unit 43 receives, from the PC 10, a registration request for the above-mentioned IP addresses IPA1 to IPA3 and box names. The registration request is based on a Simple Network Management Protocol (SNMP) protocol. In addition, the UDP/IP unit in the first communication unit 43 receives a press-down information acquisition request and sends back, to the PC 10, the button information from the first button information control unit 42, the button information corresponding to this request and being based on the SNMP protocol.

The first button information control unit 42 includes an SNMP agent on the first communication unit 43, and control programs on the operation panel 26 and the button information storage unit 230, which serve as processing targets. The button information storage unit 230 is a portion of a management information base (MIB).

Figure 4:
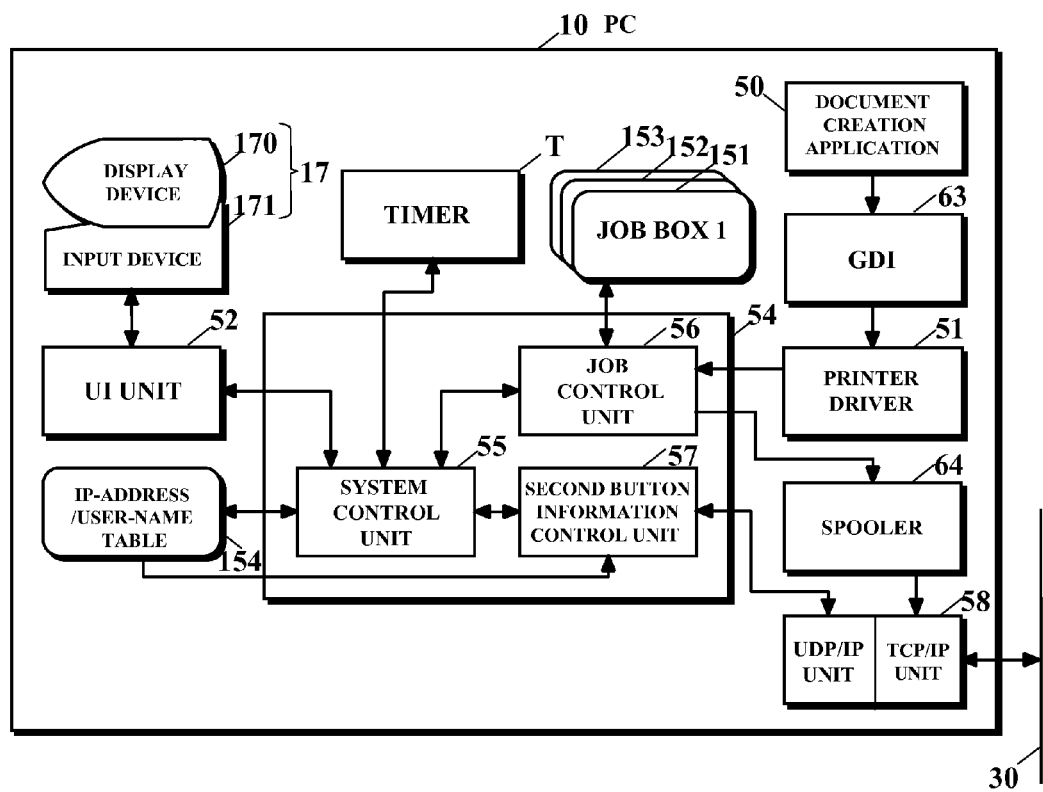
FIG. 4 is a block diagram illustrating a functional configuration relating to print of the PC.
Figure 5:
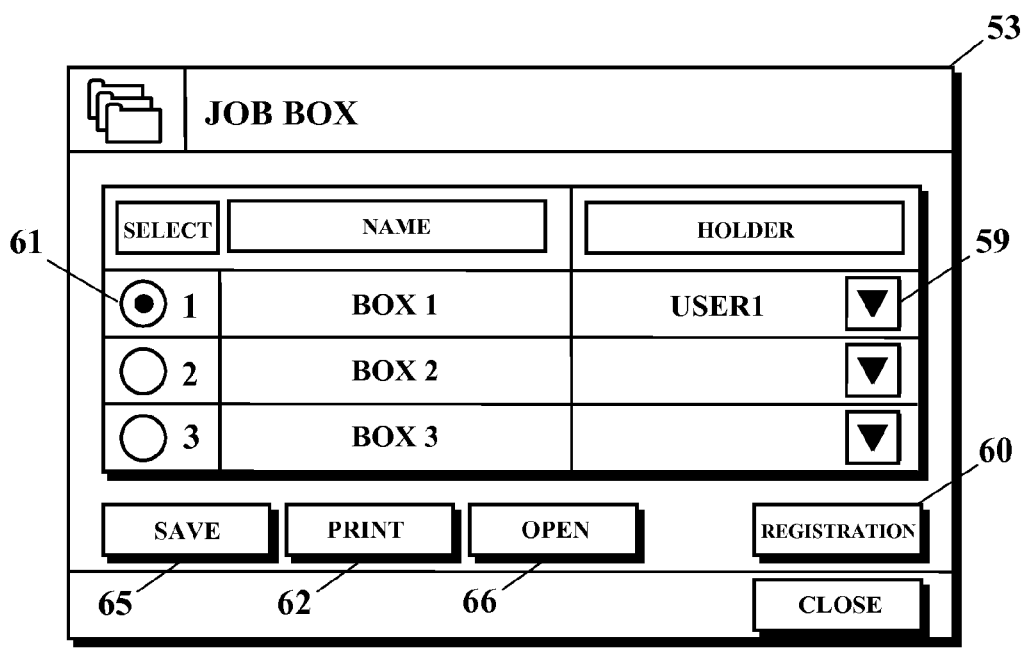
FIG. 5 is a schematic diagram illustrating a job box screen displayed by a print manager before start of printing.

FIG. 4 is a block diagram illustrating the functional configuration relating to print of the PC 10. FIG. 5 is a schematic diagram illustrating a job box screen 53 displayed by a print manager before the start of printing.

Blocks 151 to 154 in FIG. 4 are stored within the auxiliary storage device 15 in FIG. 2. The job boxes 151 to 153 are folders for storing print job files, and the job boxes 151 to 153 correspond to the buttons 261 to 263 in FIG. 3, respectively. An IP-address/user-name table 154 indicates the IP address and the user name of each of the PCs 10-1 to 10-N.

The I/O device 17 includes a display device 170 and an input device 171. The input device 171 includes, for example, a keyboard and a pointing device.

A user may activate a document creation application 50 and create a document. Then, the user may select a print menu and activate a print manager in the OS, where the print manager is called via a printer driver 51. The print manager causes a user interface (UI) unit 52 to display a print dialog (not illustrated) in the display device 170. The user may operate the input device 171, and set job information such as a page size, single-side/double-side printing, and the number of print copies. When a setting item called "job box" has been selected in the print dialog, such a job box screen 53 as illustrated in FIG. 5 is displayed in the display device 170.

A second control unit 54 is a box print tool cooperating with the printer driver 51 and the user interface unit 52. The second control unit 54 includes a system control unit 55 controlling the units within PC 10, a job control unit 56 controlling a box print job, and a second button information control unit 57 controlling the button information of the image forming apparatus 20.

In response to an operation performed on the input device 171 by the user, the user interface (UI) unit 52 causes the display device 170 to display a menu relating to a print function. In each menu, in response to an operation performed on the input device 171 by the user, the user interface unit 52 notifies the system control unit 55 of an instruction, a setting value (selection) which has been input, and the system control unit 55 performs process according to this.

In the same way as the first communication unit 43 in FIG. 3, a second communication unit 58 includes the network interface 16 in FIG. 2 and a communication protocol stack for the OS. This communication protocol stack includes a TCP/IP unit and a UDP/IP unit. The second communication unit 58 supplies, to the second button information control unit 57, information received from the UDP/IP unit in the image forming apparatus 20.

The second button information control unit 57 includes an SNMP manager on the second communication unit 58, and a control program on the system control unit 55.

Figure 6:
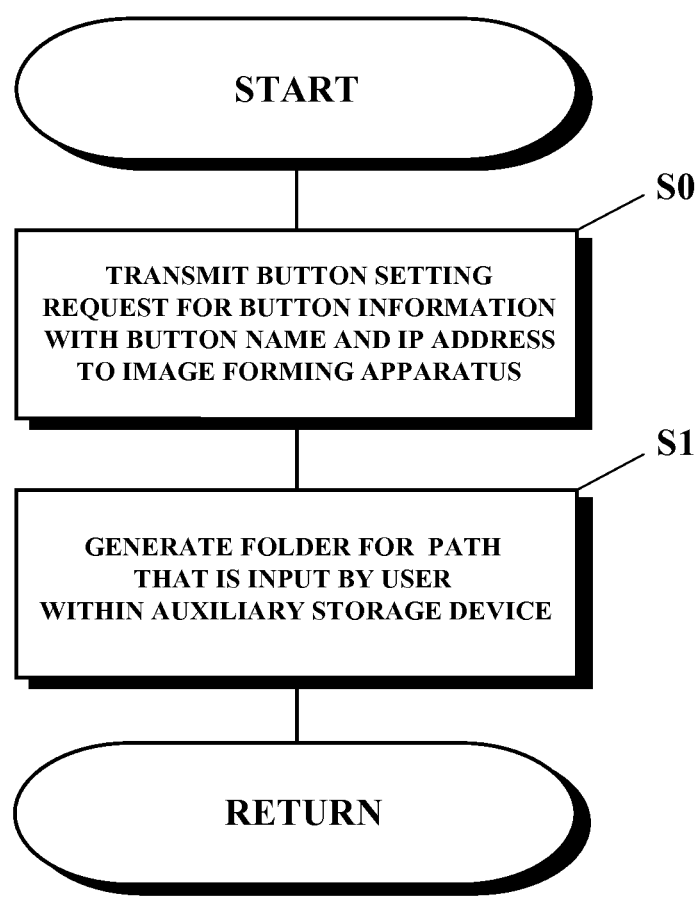
FIG. 6 is a flowchart illustrating process performed by a UI unit and a system control unit in the PC in response to an operation of a user during display of the job box screen.

FIG. 6 is a flowchart illustrating process performed by the UI unit 52 and the system control unit 55 in the PC 10 in response to an operation of a user during display of the job box screen 53 before the user presses down one of the buttons 261 to 263 in the image forming apparatus 20.

Numeric characters, 1 to 3, in a "SELECTION" field in a left column on the job box screen 53 coincide with the identifiers of the buttons 261 to 263 in the image forming apparatus 20, respectively. Immediately before the job box screen 53 is displayed, and in response to a notice of the job box selection from the user interface unit 52, the system control unit 55 requests the first button information control unit 42 in the image forming apparatus 20 to acquire press-down information, via the second button information control unit 57. In response to this, the first button information control unit 42 sends back the content of the button information storage unit 230 to the system control unit 55 via the second button information control unit 57. The system control unit 55 reflects this button information into the job box screen 53 via the user interface unit 52.

In a step SO, the user operates the input device 171 to display a box name in a "NAME" field on the job box screen 53. The user points to an arrow icon 59 in a "HOLDER" field, and causes a drop-down list coupled to a user name in the IP-address/user-name table 154. By selecting a user name, the user selects an IP address serving as the identifier of the PC 10. Next, when the user has pressed down a registration button 60, the user interface unit 52 notifies the system control unit 55 of this. In response to this, the system control unit 55 specifies button information including a box name and an IP address on the IP-address/user-name table 154, where the IP address corresponds to a user name with respect to each of button identifiers i=1 to 3 in the "selection" field, and instructs the second button information control unit 57 to perform a button setting. In response to this, the second button information control unit 57 transmits a button setting request for the button information, to the first button information control unit 42 via the communication unit 58 and the first communication unit 43 in the image forming apparatus 20.

In response to the above-described transmission, the first button information control unit 42 overwrites and sets a box name within the button information storage unit 230 with "BOX i" with respect to each of i=1 to 3, the box name corresponding to the button identifier i. The first button information control unit 42 overwrites and sets the IP address to an IP address IPAi.

In a step S1, the user double-clicks the box name, "BOX i", and causes a path input field (not illustrated) to be displayed. The user inputs and confirms, in the path input field, the path of the "BOX i" within the auxiliary storage device 15. The user interface unit 52 notifies the system control unit 55 of the input of the path. In response to the notification, the system control unit 55 creates, as "BOX i", a folder for this path within the auxiliary storage device 15.

In FIG. 5, the user clicks a radio button 61 to select a box 15i (i=1 in FIG. 5), and presses down a print button 62. In FIG. 4, on the basis of document data, the document creation application 50 calls a function 63 within the graphics device interface (GDI) library of WINDOWS® (registered trademark). Via the printer driver 51, the GDI function 63 converts the document data into page description language (PDL) data interpretable by the image forming apparatus 20.

The job control unit 56 converts the job information into a printer job language (PJL) command. The job control unit 56 adds the job information to the PDL data, stores the job information within the selected box 15i as a job file, and transfers control to the system control unit 55. The system control unit 55 stores therein the path of this job file as a path selected by the user. In addition, the system control unit 55 activates a timer T.

The timer T includes a hardware timer within the CPU 11 in FIG. 2, which the software interval timer of the OS utilizes. Every time a predetermined time interval has elapsed, the timer T causes a time-up event to occur for the system control unit 55.

Figure 7:
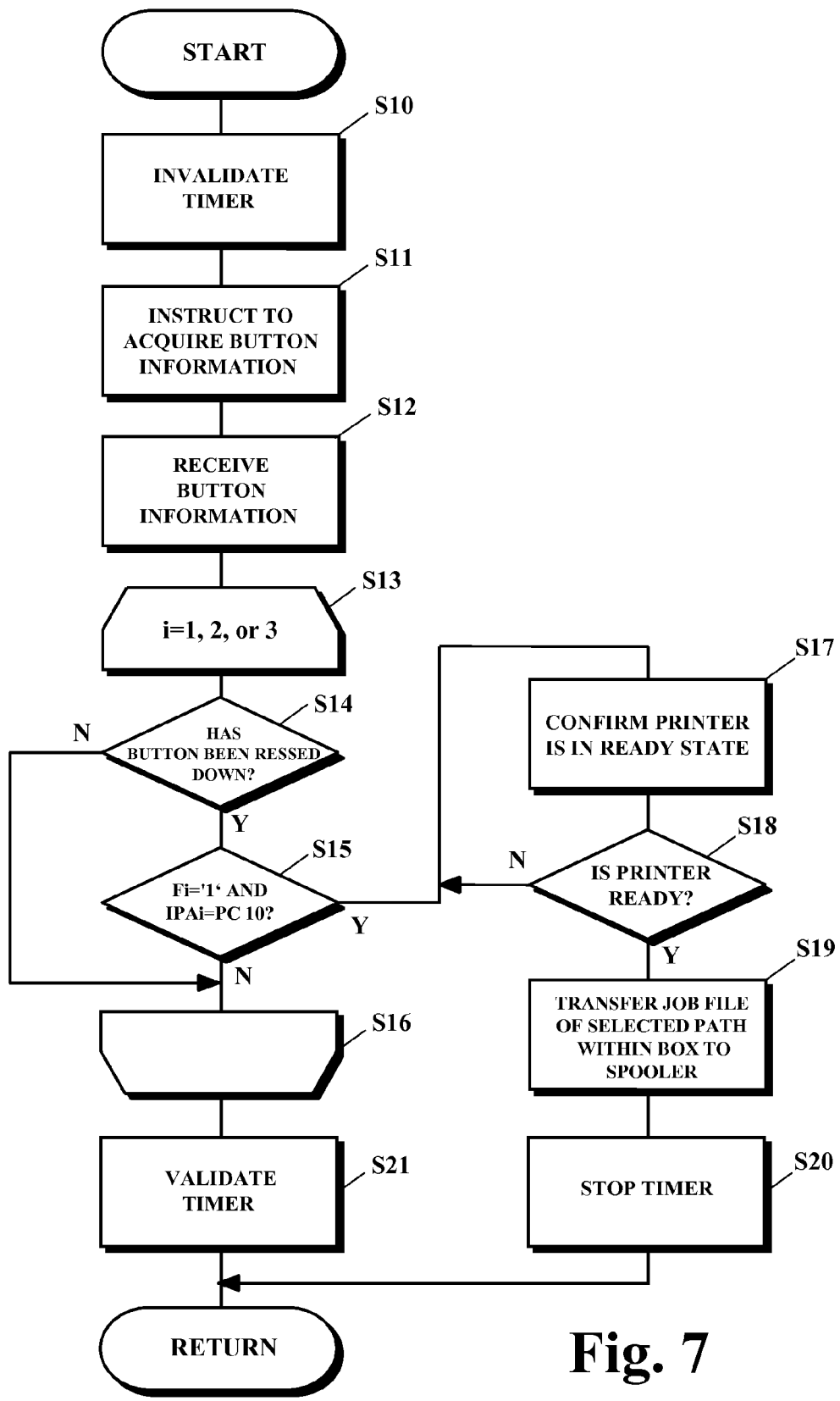
FIG. 7 is a flowchart illustrating process performed in the system control unit in the PC and started in response to an occurrence of a time-up event.

FIG. 7 is a flowchart illustrating process performed in the system control unit 55 in the PC 10 and started in response to an occurrence of a time-up event.

In a step S10, the system control unit 55 invalidates the timer T, and suppresses the occurrence of a time-up event.

In a step S11, via the second button information control unit 57, the system control unit 55 instructs the second button information control unit 57 to acquire the button information. In response to this instruction, the second button information control unit 57 requests button information from the first button information control unit 42 in the image forming apparatus 20 via the second communication unit 58 and the network 30.

In a step S12, the second button information control unit 57 receives the button information from the first button information control unit 42 via the second communication unit 58.

The second button information control unit 57 repeats processing operations ranging from a step S13 to a step S16 with respect to each of i=1 to 3 of the flag Fi and the IP address IPAi that serve as the button information, until affirmative determination is performed in the step S15.

In the steps S14 and S15, if the Fi='1' and the IP address IPAi=PC 10, the process proceeds to a step S17. In addition to this, if, with respect to all of i=1 to 3, this condition IPAi=PC 10 is not satisfied, the process proceeds to a step S21.

In the step S17, the second button information control unit 57 returns control to the system control unit 55. The system control unit 55 requests the printer control unit 41 to confirm whether or not the printer 28 is in a ready state, via the second button information control unit 57, the communication unit 58, and the first button information control unit 42 in the image forming apparatus 20. The printer control unit 41 confirms whether or not the printer 28 is in a ready state, and the printer control unit 41 sends back the result thereof to the system control unit 55 via the first button information control unit 42 and the second button information control unit 57.

In the step S19, when it is indicated that the printer 28 is in a ready state, the system control unit 55 transfers, to a spooler 64, the job file of the selected path within the box BOX i corresponding to the Fi='1' in the step S14. The spooler 64 transmits job files in the reception order thereof, to the printer control unit 41 via the communication unit 58 and the first communication unit 43 in the image forming apparatus 20.

When the printer 28 is not in a ready state, the system control unit 55 returns to the step S17. Using another timer, this loop processing operation in the steps S17 and S18 is performed periodically.

The printer control unit 41 stores the received job file in a buffer area within the DRAM 24. Then, in accordance with a buffer size, having converted PDL data into an intermediate language in units of pages or in units of blocks into which a page is divided, the printer control unit 41 subjects the data to bit map expansion, and sends the data to the print engine of the printer 28. By controlling the paper feeding/ejection mechanism of the printer 28, the printer control unit 41 causes an image to be formed on a sheet of paper, and causes this sheet of paper to be ejected.

When printing for all pages has been completed, the printer control unit 41 resets the flag Fi corresponding to the box name, "BOX i", displayed in the indicator 260, and clears this display.

In a step S20, the timer T is stopped, the path name of the stored job file is deleted, and the process is returned.

In the step S21, the timer T is validated, the suppression of the occurrence of the time-up event is cancelled, and the process is returned.

In FIG. 5, if the save button 65 has been pressed down instead of the print button 62, a job file is saved within the job box 15i in the same way as described above. However, when the job file is saved within the job box 15i, the timer T is not activated, and printing is not performed.

In FIG. 5, if an open button 66 is pressed down and a box is opened after the job box 15i has been selected, a job file within the box may be directly selected. Then, when the print button 62 is pressed down the image forming apparatus 20 is put into a print-start standby state. When the button 26i in the image forming apparatus 20 is pressed down, the path of this job file is stored, and the printing of the selected job file is performed in the same way as described above.

According to the present first embodiment, when the user has put the image forming apparatus 20 into a print-start standby state by selecting a job file stored in the auxiliary storage device 15 in the PC 10, and pressed down a button (from among the buttons 261 to 263 in the image forming apparatus 20) corresponding to a box including the selected job file, the PC 10 transmits the job file to the image forming apparatus 20 via the spooler 64, and print execution is started. Even if the image forming apparatus 20 has no auxiliary storage device, it may be possible to realize the same box print utilizing another image forming apparatus that has an auxiliary storage device.

In addition, it may be possible for the user to set, from the PC 10 via the network 30, an association between one or more selected from among the buttons 261 to 263 in the image forming apparatus 20 and the PC 10. Even if the function of the image forming apparatus 20 is enhanced as described above, it may be possible to further simplify the configuration thereof and achieve price reduction.

[Second Embodiment]

Figure 8:
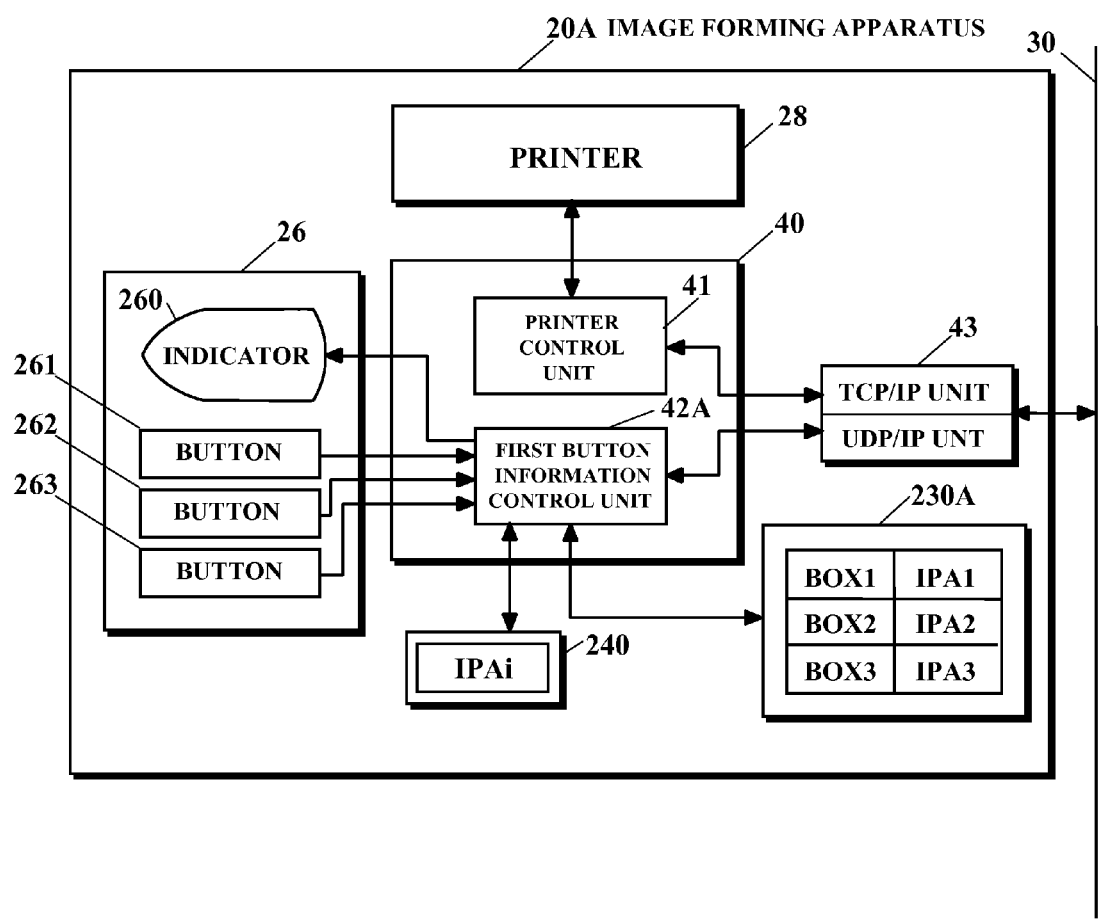
FIG. 8 is a block diagram illustrating a functional configuration relating to a printer in the image forming apparatus, according to a second embodiment of the present disclosure.

FIG. 8 is a block diagram illustrating the functional configuration relating to a printer in an image forming apparatus 20A, according to a second embodiment of the present disclosure.

In the second embodiment, a button information storage unit 230A is included where the flags F1 to F3 are omitted from the button information storage unit 230 in FIG. 3, and a pressed-down button information storage unit 240 is included within the DRAM 24. The initial value of the pressed-down button information storage unit 240 is NULL or empty. In response to a button 26i pressed down by a user, a first button information control unit 42A copies an IP address IPAi within the button information storage unit 230A to the pressed-down button information storage unit 240. In addition, the other configuration elements of the image forming apparatus 20A and the functions thereof are the same as the configuration elements of the image forming apparatus 20 in the first embodiment and the functions thereof.

Figure 9:
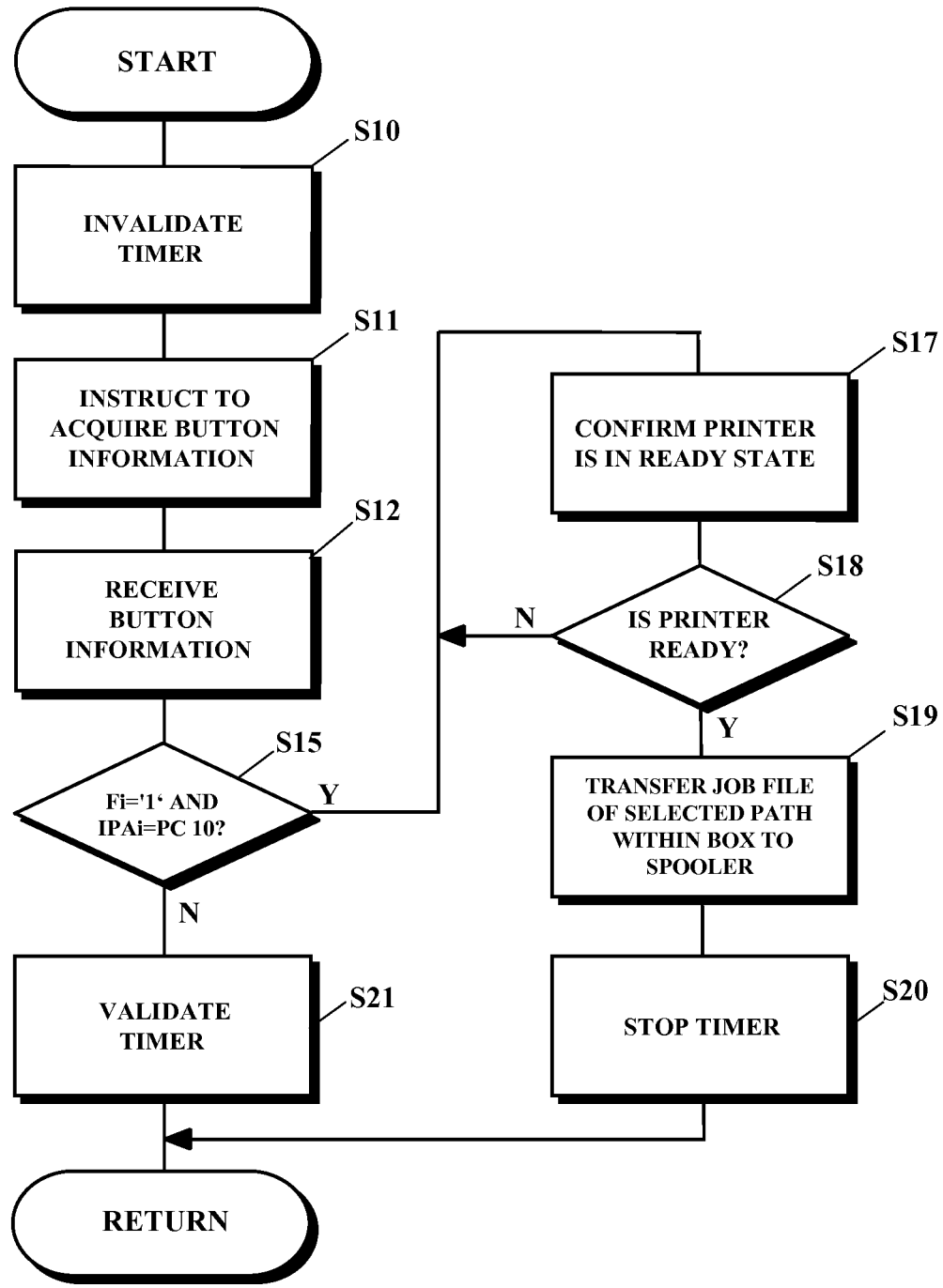
FIG. 9 is a flowchart illustrating process performed in the system control unit in the PC and started in response to an occurrence of a time-up event, according to the second embodiment of the present disclosure.

FIG. 9 is a flowchart illustrating a process performed in the system control unit in the PC 10 and started in response to an occurrence of a time-up event, according to the second embodiment of the present disclosure.

In response to a press-down information acquisition request from the PC 10 in a step S11, the first button information control unit 42A sends back the IP address IPAi in the pressed-down button information storage unit 240.

In a step S15, if the IP address IPAi matches the the IP address IPA of the PC 10, the second button information control unit 57, the process proceeds to a step S17. If the IP address IPAi matches the the IP address IPA of the PC 10, the second button information control unit 57, the process proceeds to a step S21.

When printing for all pages has been completed, the first button information control unit 42A clears the display of the indicator 260, and clears the content of the pressed-down button information storage unit 240 (NULL or empty).

The other control of the flowchart illustrated in FIG. 9 is the same as the control of the flowchart illustrated in FIG. 6 in the first embodiment.

According to the present second embodiment, processing operations in the first button information control unit 42A and the second button information control unit 57 become easier than in the processing operations in the first embodiment.

While various aspects and embodiments have been disclosed herein, other aspects and embodiments are possible. Other designs may be used in which the above-described components are each present.

For example, while, in the first and second embodiments, a case has been described where the printing unit is a printer, the printing unit may also be a facsimile (including a facsimile modem).

In addition, in the first and second embodiments, when the steps S17 and S18 are omitted, the time-up interval of the timer T is shortened, the flags F1 to F3 are not used, and the image forming apparatus 20 has received the press-down information acquisition request, the image forming apparatus 20 or 20A may also directly detect which of the buttons 261 to 263 is pressed down.

In addition, the IP addresses IPA1 to IPA3 illustrated in FIG. 3 or FIG. 8 and the IP-address/user-name table 154 in FIG. 4 may also adopt configurations in which unique device IDs (UDIDs) are used in place of the IP addresses.

In addition, the printer driver 51, the first communication unit 43, and the second communication unit 58 are not limited to the protocols described in the first embodiment, and may also adopt configurations in which another protocol is used.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming system comprising:
an image forming apparatus coupled to a network, wherein the image forming apparatus includes a button, a memory device, a printing unit including a printer or a facsimile, and a first control unit, wherein the first control unit is configured to
store, in the memory device, an information processing apparatus identifier that is assigned to the button,
transmit, to the information processing apparatus, press-down information in response to a request for the press-down information that is received from the information processing apparatus via the network, wherein the press-down information includes an indication of whether or not the button has been pressed down, the information processing apparatus identifier corresponding to the button, and a box name of a job box assigned to the button, and
cause the printing unit to print, on a sheet, an image based on print job data that is received from the information processing apparatus via the network; and
an information processing apparatus coupled to the network, wherein the information processing apparatus includes an auxiliary storage device, an input unit, a printing unit driver including a printer driver or a facsimile driver, a spooler, and a second control unit, wherein the second control unit is configured to
periodically transmit the request for the press-down information to the image forming apparatus via the network, in response to a print-start instruction from the input unit or the printing unit driver,
determine whether or not the information processing apparatus identifier in the press-down information that is received from the image forming apparatus matches the information processing apparatus identifier of the information processing apparatus, and
transmit the print job data specified the input unit or the printing unit driver to the image forming apparatus via the spooler if the information processing apparatus identifier in the press-down information that is received from the image forming apparatus matches the information processing apparatus identifier of the information processing apparatus.

2. The image forming system according to claim 1, wherein the press-down information includes a flag indicating whether or not the button is pressed down.

3. The image forming system according to claim 1, wherein the second control unit is further configured to transmit, to the first control unit, an information processing apparatus identifier that is received from the input unit, and
wherein the first control unit is further configured to assign, to the button, the information processing apparatus identifier that is received from the input unit.

4. The image forming system according to claim 1, wherein the image forming apparatus further includes an indicator for displaying a name of the button.

5. The image forming system according to claim 1, wherein the image forming apparatus further includes a communication unit for receiving the print job data from the information processing apparatus and printing the image data of the document image on the sheet based on the print job data.

6. The image forming system according to claim 1, wherein the information processing apparatus further includes a spooler for receiving a job file and transmitting the job file to the printing unit.

7. An image forming apparatus coupled to an information processing apparatus and a network, the image forming apparatus comprising a button, a memory device, a printing unit including a printer or a facsimile, and a control unit, wherein the control unit is configured to:
store, in the memory device, an information processing apparatus identifier that is assigned to the button;
transmit, to the information processing apparatus, press-down information in response to a periodic request for the press-down information that is received from the information processing apparatus via the network, wherein the press-down information includes an indication of whether or not the button has been pressed down, the information processing apparatus identifier corresponding to the button, and a box name of a job box assigned to the button; and
cause the printing unit to print, on a sheet, an image based on print job data that is specified by the information processing apparatus and transmitted to the image forming apparatus via the network, if, in the information processing apparatus, it is determined the information processing apparatus identifier in the press-down information matches with the information processing apparatus identifier of the information processing apparatus and if the information processing apparatus identifier in the press-down information that is received from the image forming apparatus matches the information processing apparatus identifier of the information processing apparatus.

8. The image forming apparatus according to claim 7, wherein the press-down information includes a flag indicating whether or not the button is pressed down.

9. The image forming apparatus according to claim 7, wherein the control unit is further configured to receive an information processing apparatus identifier that is transmitted from the information processing apparatus, and
wherein the control unit is further configured to assign, to the button, the information processing apparatus identifier that is transmitted from the information processing apparatus.

10. The image forming apparatus according to claim 7, further comprising an indicator for displaying a name of the button.

11. The image forming apparatus according to claim 7, further comprising a communication unit for receiving the print job data from the information processing apparatus and printing the image data of the document image on the sheet based on the print job data.

12. The image forming apparatus according to claim 7, wherein the information processing apparatus further includes a spooler for receiving a job file and transmitting the job file to the printing unit.

13. An image forming method performed by an image forming system including an image forming apparatus coupled to a network and an information processing apparatus coupled to the network, the image forming method comprising:

via the image forming apparatus,
- storing, in a memory device, an information processing apparatus identifier that is assigned to a button of the image forming apparatus,
- transmitting, to the information processing apparatus, press-down information in response to a request for the press-down information that is received from the information processing apparatus via the network, wherein the press-down information includes an indication of whether or not the button has been pressed down, the information processing apparatus identifier corresponding to the button, and a box name of a job box assigned to the button,
- printing, on a sheet, an image based on print job data that is received from the information processing apparatus via the network; and via the information processing apparatus,
- periodically transmitting the request for the press-down information to the image forming apparatus via the network, in response to a print-start instruction,
- determining whether or not the information processing apparatus identifier in the press-down information that is received from the image forming apparatus matches with the information processing apparatus identifier of the information processing apparatus, and
- transmitting the print job data specified by the information processing apparatus to the image forming apparatus if the information processing apparatus identifier in the press-down information that is received from the image forming apparatus matches the information processing apparatus identifier of the information processing apparatus.

14. The image forming method according to claim 13, wherein
the press-down information includes a flag indicating whether or not a button is pressed down.

15. The image forming method according to claim 13, further comprising:

via the information processing apparatus,
- transmitting, to the image forming apparatus, an information processing apparatus identifier that is transmitted from the information processing apparatus; and via the image forming apparatus,
- assigning, to the button, the information processing apparatus identifier that is transmitted from the information processing apparatus.

16. The image forming method according to claim 13, further comprising, via the image forming apparatus,
- displaying, via an indicator, a name of a button.

17. The image forming method according to claim 13, further comprising, via the image forming apparatus,
- receiving, via a communication unit, the print job data from the information processing apparatus and printing the image data of the document image on the sheet based on the print job data.

18. The image forming method according to claim 13, further comprising, via the information processing apparatus,
- receiving, via a spooler, a job file; and
- transmitting, via the spooler, the job file to the printing unit.

* * * * *